US010887085B2

(12) United States Patent
Pe'er et al.

(10) Patent No.: US 10,887,085 B2
(45) Date of Patent: Jan. 5, 2021

(54) SYSTEM AND METHOD FOR CONTROLLING USAGE OF CRYPTOGRAPHIC KEYS

(71) Applicant: Unbound Tech Ltd., Petah Tiqva (IL)

(72) Inventors: Guy Pe'er, Talmey Yechiel (IL); Valery Osheter, Ashdod (IL); Saar Peer, Oranit (IL); George Wainblat, Tel Mond (IL); Oz Mishli, Kfar Saba (IL)

(73) Assignee: UNBOUND TECH LTD., Petah Tiqva (IL)

( * ) Notice: Subject to any disclaimer, the term of this patent is extended or adjusted under 35 U.S.C. 154(b) by 324 days.

(21) Appl. No.: 15/887,401

(22) Filed: Feb. 2, 2018

(65) Prior Publication Data

US 2019/0222414 A1 Jul. 18, 2019

Related U.S. Application Data

(60) Provisional application No. 62/617,380, filed on Jan. 15, 2018.

(51) Int. Cl.

| H04L 9/08 | (2006.01) |
|---|---|
| H04L 29/06 | (2006.01) |
| G06F 21/55 | (2013.01) |
| G06F 3/06 | (2006.01) |
| G06F 21/60 | (2013.01) |

(52) U.S. Cl.
CPC ............ *H04L 9/0819* (2013.01); *G06F 3/065* (2013.01); *G06F 21/552* (2013.01); *G06F 21/602* (2013.01); *H04L 9/085* (2013.01); *H04L 9/088* (2013.01); *H04L 9/0894* (2013.01); *H04L 63/10* (2013.01); *H04L 63/0428* (2013.01); *H04L 2209/46* (2013.01)

(58) Field of Classification Search
CPC ....... H04L 9/0819; H04L 9/088; H04L 9/085; H04L 9/0894; H04L 63/10; H04L 63/0428; H04L 2209/46; G06F 21/552; G06F 21/602; G06F 3/065
See application file for complete search history.

(56) References Cited

U.S. PATENT DOCUMENTS

| 2016/0105402 A1* | 4/2016 | Soon-Shiong ...... G06F 21/6245 713/164 |
|---|---|---|
| 2016/0261409 A1* | 9/2016 | French ..................... H04L 9/00 |
| 2018/0276417 A1* | 9/2018 | Cerezo Sanchez ..... G06F 21/74 |

(Continued)

*Primary Examiner* — Khoi V Le
(74) *Attorney, Agent, or Firm* — Alphapatent Associates, Ltd.; Daniel J. Swirsky

(57) ABSTRACT

The subject matter discloses a computerized system for securing data, comprising a first node, comprising a first memory storage configured to store a first share of a cryptographic key and a communication module, a second node, in communication with the first node, comprising a second memory storage configured to store a second share of the cryptographic key, wherein the first share and the second share of the cryptographic key are required to perform a cryptographic operation using a multi-party computation (MPC) process, wherein the second node further comprises a control unit configured to change an operation mode of the second share from enable to disable, wherein the disable operation mode prevents performing the cryptographic operation using the MPC process.

16 Claims, 5 Drawing Sheets

(56) References Cited

U.S. PATENT DOCUMENTS

2019/0149333 A1* 5/2019 Harnik ................. H04L 9/3239
  713/176
2019/0311100 A1* 10/2019 Lindell .............. G06K 9/00006
2019/0372768 A1* 12/2019 Veeningen ............ H04L 9/3218

* cited by examiner

US 10,887,085 B2

SYSTEM AND METHOD FOR CONTROLLING USAGE OF CRYPTOGRAPHIC KEYS

CROSS REFERENCE TO RELATED APPLICATIONS

The present application claims the benefit of U.S. Provisional Application No. 62/617,380, filed Jan. 15, 2018 the subject matter of which is incorporated by reference in its entirety.

FIELD OF THE INVENTION

The present invention is generally related to data security, more specifically to controlling usage of cryptographic keys.

BACKGROUND OF THE INVENTION

Attackers of secured online resources such as cloud storages wish to access the data encrypted in the secured online resources. Information stored in secured online resources may also be compromised by government subpoenas, which require cloud service providers that control the infrastructure to decrypt the information. Those service providers are obliged to obey the subpoena, many times without notifying the customer whose keys/data are sought after. In order to prevent attackers from decrypting the data encrypted and stored in the secured online resources, businesses need a solution that grants them full and sole control of their cryptographic keys at all times, so that the cryptographic keys and data can never be exposed during a breach.

Controlling the key in a cloud storage is considered to involve a tradeoff between security and usability. HSM (hardware security module) solutions are more secure and limit usability, while usability is more the focus when storing data in multiple cloud locations. Current approaches in key management in the cloud include a Key Management Service (KMS) offered natively by a cloud service provider, Cloud HSM offered by a cloud service provider, Bring Your Own Key (BYOK) and Hold Your Own Key (HYOK). One thing all the above approaches share is hard tradeoff between security and usability.

SUMMARY OF THE INVENTION

The subject matter discloses a solution for safely consuming Infrastructure as a service (IaaS) and Software as a service (SaaS) online storage and cloud services while retaining full control of the most sensitive cryptographic keys safeguarding sensitive data and applications.

It is an object of the subject matter to disclose a computerized system for securing data, comprising a first node, comprising a first memory storage configured to store a first share of a cryptographic key and a communication module, a second node, in communication with the first node, comprising a second memory storage configured to store a second share of the cryptographic key, wherein the first share and the second share of the cryptographic key are required to perform a cryptographic operation using a multi-party computation (MPC) process, wherein the second node further comprises a control unit configured to change an operation mode of the second share from enable to disable, wherein the disable operation mode prevents performing the cryptographic operation using the MPC process.

In some cases, the first node is located on an online storage platform and the second node is located in a data center. In some cases, the second node further comprises a management interface configured to enable a user of the system to input a command to change the operation mode of the second share.

In some cases, the second node further comprises a log storage configured to store operations that require the second share. In some cases, the second node further comprises a processing module extracting information from the log storage and configured to determine irregular use of the second share. In some cases, the processing module generates a process for changing the operation mode of the second share from enable to disable upon determination of the irregular use of the second share.

In some cases, the second node further comprises multiple different shares of cryptographic keys, each of the shares is configured to enable decryption of data in a different node communicating with the second node.

In some cases, the system further comprises a key share storage configured to store key shares of multiple containerized software modules requesting access from the security server.

It is an object of the subject matter to disclose a method, comprising obtaining a first node and a second node in communication with the first node, the first node comprises a first memory storage configured to store a first share of an cryptographic key and a communication module, the second node comprises a second memory storage configured to store a second share of the cryptographic key, performing a multi-party computation (MPC) process between a controlled computerized node and another node using the first share and the second share, receiving a command to change an operation mode of the key share, changing the operation mode of the key share.

In some cases, the method further comprises storing usage log of the key share stored in the controlled node. In some cases, the method further comprises processing the usage log and identify irregular behavior in key share usage.

In some cases, the command is received from an administrator device receiving the usage log of the key share. In some cases, changing the operation mode of the key share disables the MPC process. In some cases, changing the operation mode of the key share comprises disabling communication between the controlled computerized node and the other node. In some cases, changing the operation mode of the key share comprises deleting the key share from a memory of the controlled computerized node.

In some cases, the method further comprises a set up stage of the first node and the second node. In some cases, the method further comprises copying an image of a known and malware-free hardened operating system into the first node and the second node. In some cases, the method further comprises creating a temporary customer-controlled node and copying the data stored at the temporary customer-controlled node to a customer controlled location and creating a second customer-controlled node. In some cases, the method further comprises copying the data stored at the temporary customer-controlled node to the second customer-controlled node. In some cases, the method further comprises generating a Transport Layer Security (TLS) communication channel between the second customer-controlled node and the non-controlled node.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention discloses a system and method for method controlling usage of cryptographic keys. The system comprises two computerized nodes, each node is located on a distinct entity and comprises a share of a cryptographic key. The cryptographic may be encryption keys, signing keys and any other keys used for cryptography. Both shares are required to sign and/or encrypt and/or decrypt information stored on at least one of the entities using a Multi-Party computation (MPC) process. The MPC process is executed by exchanging information between the nodes, without revealing the key shares or the entire key. The nodes may communicate over the internet, a cellular network, LAN, WAN or any other technique or protocol desired by a person skilled in the art.

At least one of the two nodes is controlled by an owner of the information. The owner may be a user or an entity that owns the information or is responsible for the information. Controlling the nodes may be done manually using a user interface into which the user inputs data or commands, or automatically using a software controlling the key shares according to a predefined set of rules. For example, a first node is located in an online storage server, also defined as a cloud service, and the second node is located on a data center. The second node may be controlled by an IT manager of the data center or by a software defined by the owner of the data center. The second node is controlled in a manner that enables changing an operation mode of the key share stored in the second node. Changing the operation mode includes disabling the key share, shutting down the second node communication with the first node, deleting the key share or any other process, function or operation that prevents performing an MPC process between the first node and the second node.

Figure 1A:
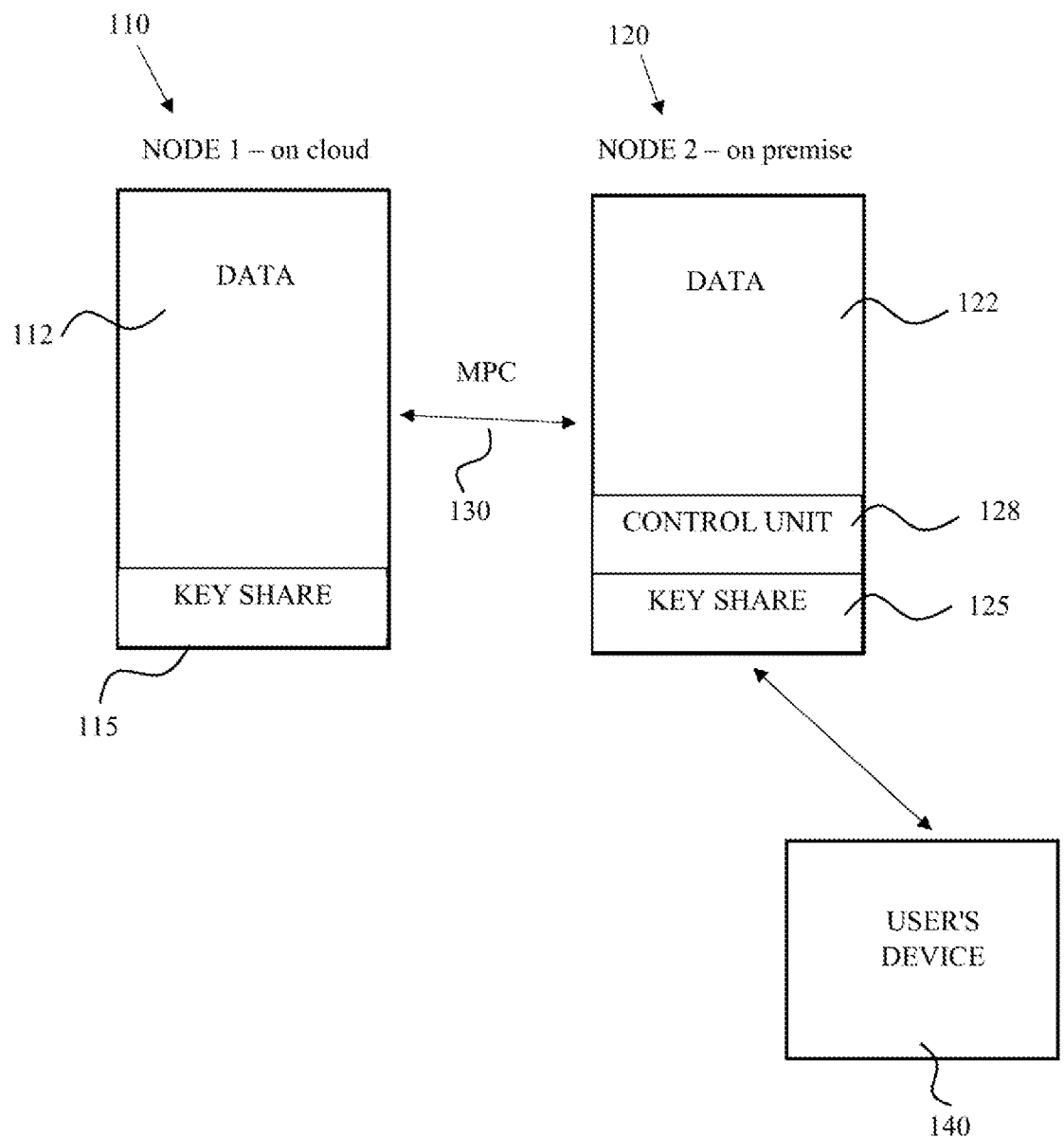
FIG. 1A shows two nodes storing key shares used to perform MPC, one node is stored on premise, a key share of one node is controlled, according to exemplary embodiments of the present invention.

FIG. 1A shows two nodes storing key shares used to perform MPC, one node is stored on premise, a key share of one node is controlled, according to exemplary embodiments of the present invention. The first node 110 and the second node 120 are stored in two distinct entities, at least one of the entities is controlled by an owner of the data stored therein. The first node 110 stores a key share 115 used to execute an MPC process 130 with the second node 120 using a second key share 125 stored in the second node 120. Both key shares 115 and 125 are required to perform the MPC process 130. The first node 110 and the second node 120 exchange information in a predefined manner in order to perform the MPC process 130 without sending the actual key shares to the other party and without the entire key share ever being stored in a single entity when the key is generated, and when encrypting or decrypting information.

The first node 110 may be stored online, for example at an online storage service such as Amazon Web Service (AWS). The second node 120 may be stored in a data center owned by or controlled by the owner of the data. In some exemplary cases, both the first node 110 and the second node comprise storage units 112 and 122 respectively, configured to store data owned by the same owner. In some exemplary cases, the second node 120 is controlled by the information owner while the first node 110 stored at the online storage service is not controlled by the information owner.

The operation mode of the second key share 125 may be controlled by a software operating on the second node 120, or on the entity in which the second node 120 is stored. In some exemplary cases, the operation mode of the second key share 125 may be controlled via commands inputted into a user interface of a remote device 140, for example a tablet computer communicating with the second node 120 via the internet, LAN, WAN or any other technique desired by the person skilled in the art. The remote device 140 may receive information concerning usage of the key shares, identify behavioral irregularities and generate a command to change the key share mode of operation until the situation is cleared, on whether there is a breach or not. Such process may be performed internally within the second node 120, or in a computerized application operating in the entity in which the second node 120 resides.

Figure 1B:
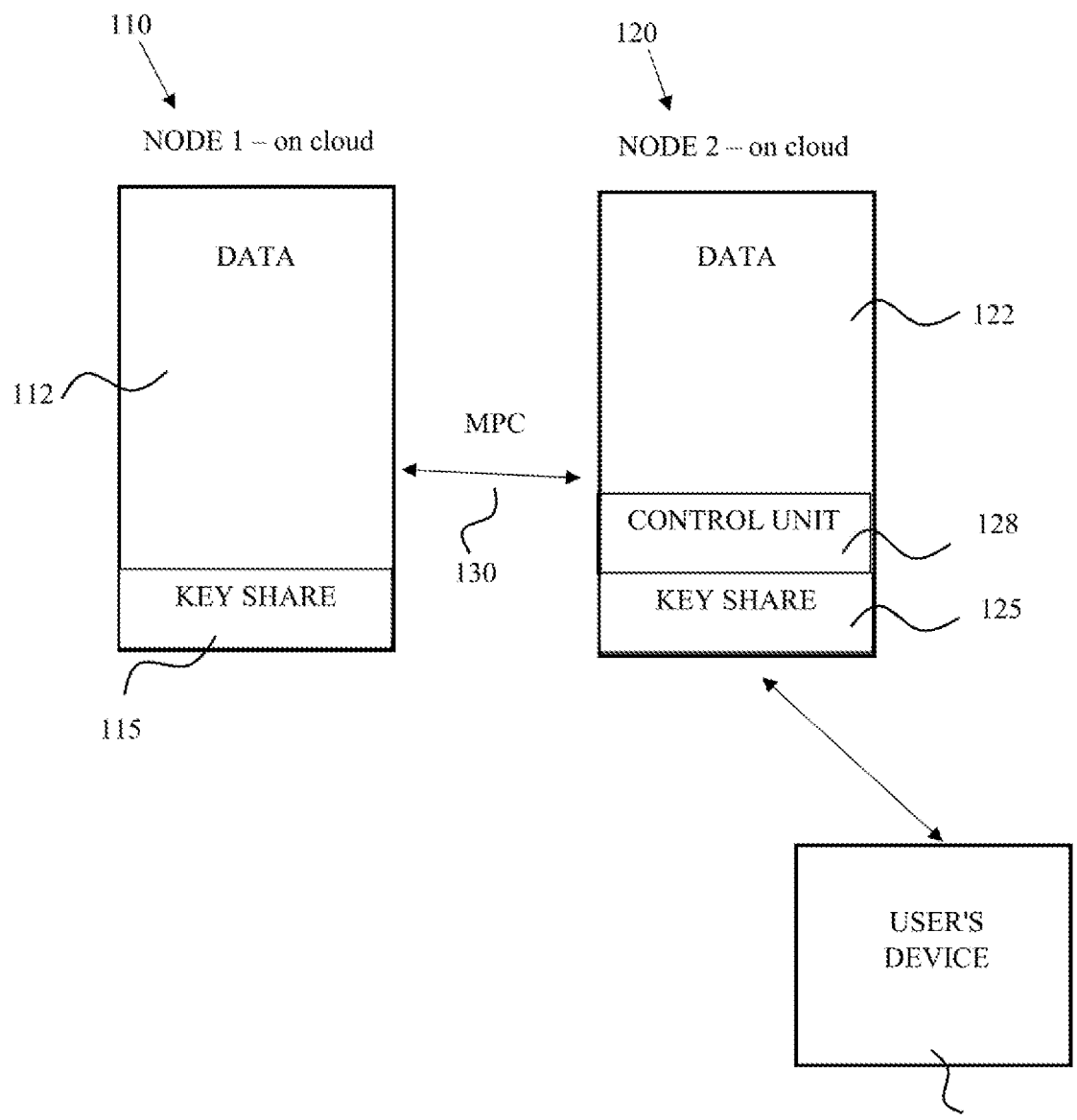
FIG. 1B shows two nodes storing key shares used to perform MPC, both nodes are stored in the cloud, a key share of one node is controlled, according to exemplary embodiments of the present invention.

FIG. 1B shows two nodes storing key shares used to perform MPC, both nodes are stored in the cloud, a key share of one node is controlled, according to exemplary embodiments of the present invention.

Figure 2:
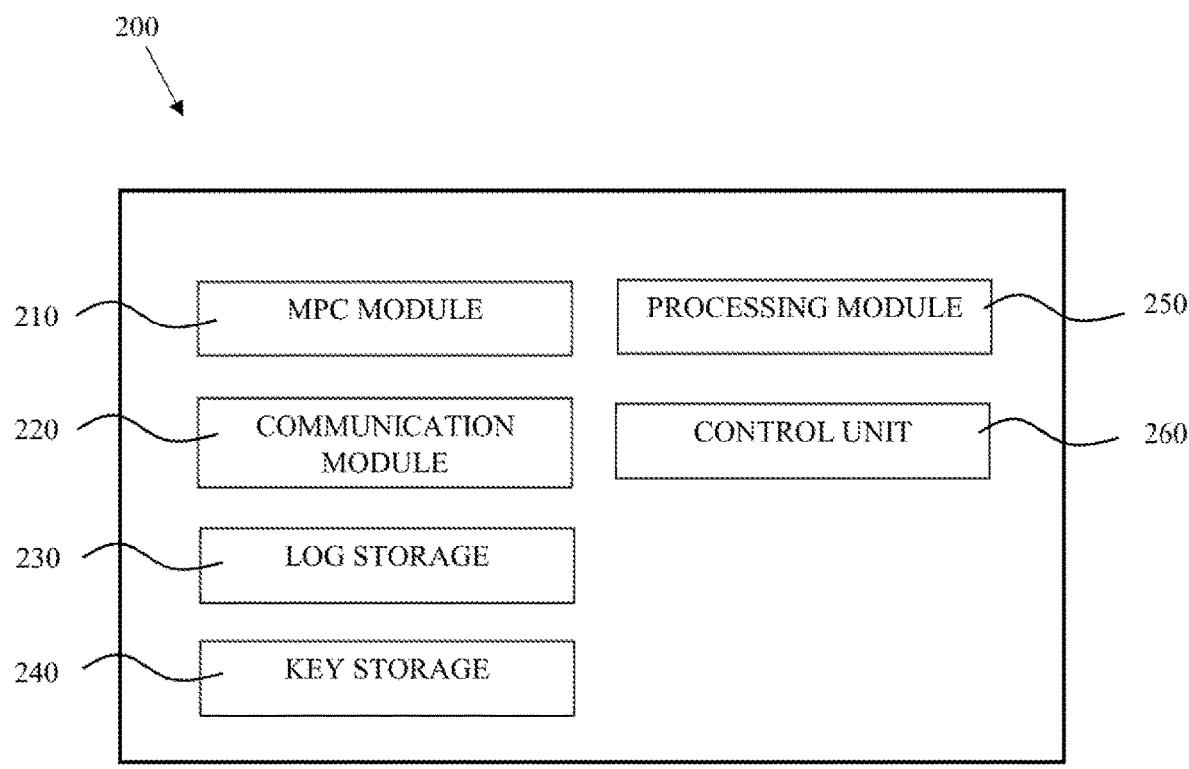
FIG. 2 shows a controlled node storing a key share used for an MPC process, according to exemplary embodiments of the subject matter.

FIG. 2 shows a controlled node storing a key share used for an MPC process, according to exemplary embodiments of the subject matter. The controlled node 200 may be the second node as disclosed below. The controlled node may be stored in a data center. The controlled node 200 is configured to perform an MPC process with another node residing in a distinct computerized entity, both the controlled node and the other node store shares of a cryptographic key. The controlled node 200 may perform the MPC process with multiple different non-controlled nodes that reside in another entity, for example in two different cloud storage services.

The controlled node 200 comprises a key share storage 240 configured to store a key share. The key share is created when splitting the cryptographic key. The key share is not revealed to another entity, and the entire key is never reconstructed when encrypting and/or decrypting information using the MPC process. Encrypting and decrypting may be performed on information stored on the entity that contains the non-controlled node cooperating with the controlled node 200 or on the entity containing the controlled node 200 when executing the MPC process. The key share storage 240 may be a volatile or non-volatile memory unit, for example may be stored in a memory address of the controlled node 200 or in a memory device connected to the controlled node 200.

The controlled node 200 comprises an MPC module 210 configured to perform the MPC process with the non-controlled node. The MPC process may result from a command or request for information, said request or command may be generated by the controlled node 200 or from the non-controlled node. The MPC module 240 is configured to execute a predefined set of operations, for example mathematical or logical operations, and send information to the non-controlled node according to the predefined set of operations. The set of operations may be stored in a memory address accessed by the MPC module, the memory address may be in the internal memory of the controlled node 200 or in a memory device connected to the controlled node 200.

The controlled node 200 comprises a communication module 220 configured to communicate with the non-controlled node when performing the MPC process. The communication module 220 may also communicate with an external device, for example an administrator's device, configured to enable or disable use of the key share. The communication module 220 may comprise a messaging server configured to receive messages and analyze the received messages. The communication module 220 may comprise an internet gateway configured to enable transmission and receipt of messages via the internet, for example commands inputted by the data center administrator via a dedicated website. The communication module 220 may comprise a wireless transceiver configured to send and receive information with the non-controlled node during the MPC process, for example via a cellular network. The communication module 220 may use WAN, LAN, a wired communication and the like. The communication module 220 interacts with the MPC module 210 when performing the MPC process with the non-controlled node.

The controlled node 200 may also comprise a log storage 230 configured to store logs of share key usage. The logs may include use property such as usage time, requestor identity, properties of the data encrypted or decrypted such as type, location of the stored data and amount of data stored and additional properties as desired by the person skilled in the art. In some exemplary cases, the log storage 230 may reside outside the controlled log 200, for example in an administrator device or in a remote server accessible to the administrator. In such a case, usage of the key share is known to the MPC module 210 and to the communication module 220 that transfer the usage data to the remote server, or directly to the administrator's device, for example to a dedicated application configured to store and analyze usage of the key share. The controlled node 200 may also comprise a processing module 250 configured to process the usage data stored in the log storage 230. The processing module 250 may have access to a predefined set of rules and compare the usage data as received, for example from the MPC module 210, with the set of rules. In case the processing module 250 identifies irregularities, the processing module 250 may send a message to the control unit 260 which changes the operation mode of the key share. The control unit 260 may receive a command from the administrator's device to change the operation mode of the key share. The control unit 260 may change the operation mode by changing a configuration in the controlled node 200, by deleting a data item comprising the key share in a known memory address of the controlled node, by adjusting communication properties of the controlled node and the like. In some exemplary cases, the control unit 260 may change the operation mode of the key share in response to a predefined event, for example shut down or technical deficiencies in the non-controlled node. In some exemplary cases, the control unit 260 may change a key share operation mode only with a specific IP address of domain, or frequency band, when transmitting wireless signals from the controlled node 200.

Figure 3:
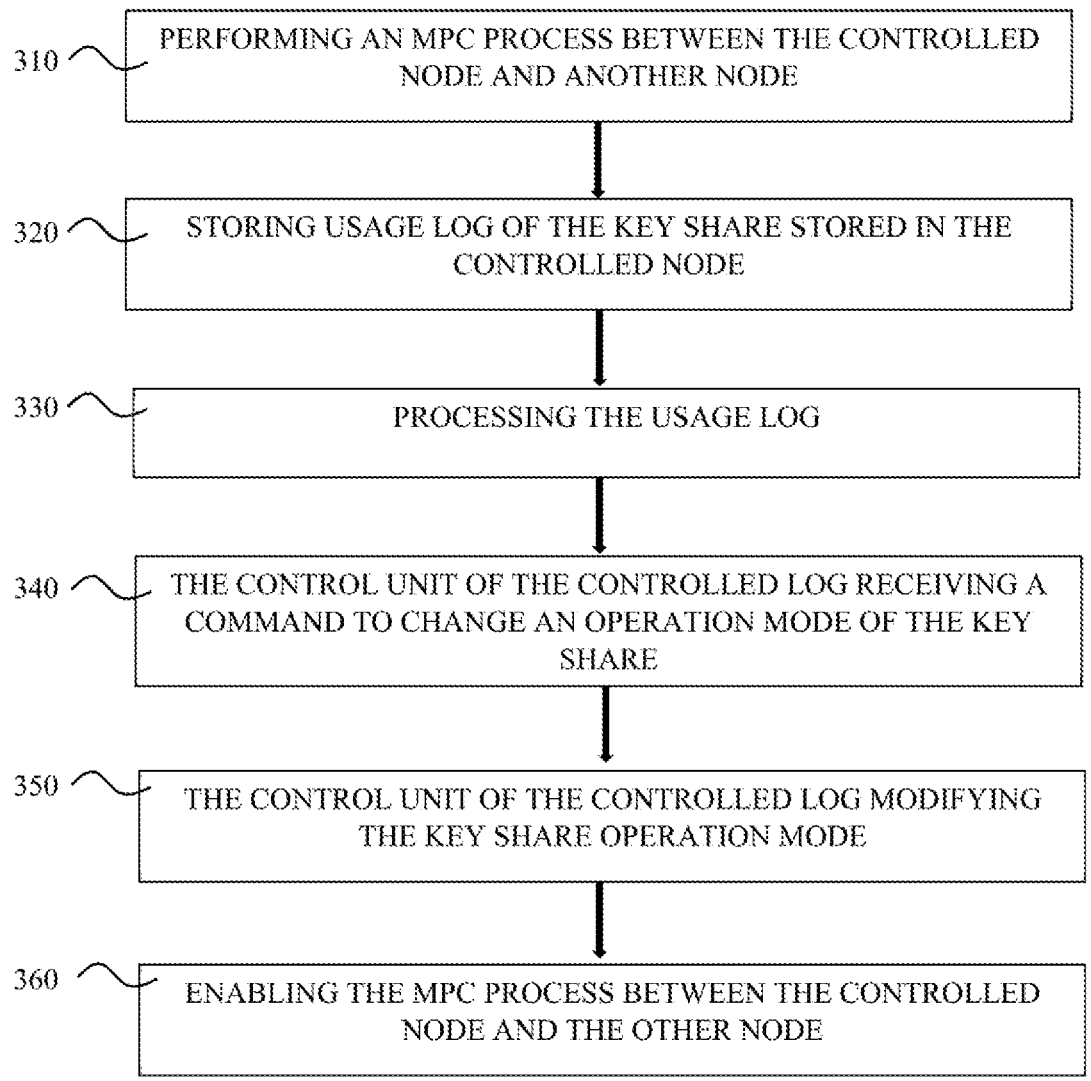
FIG. 3 shows a method for controlling key shares in computerized nodes, according to exemplary embodiments of the subject matter; and, FIG. 4 shows a method for set up stage of the nodes, according to exemplary embodiments of the subject matter.

FIG. 3 shows a method for controlling key shares in computerized nodes, according to exemplary embodiments of the subject matter. Step 310 discloses performing an MPC process between the controlled node and another node. The other node may be a controlled node or a non-controlled node. Both nodes exchange information over a network or a wired cable when performing the MPC process, without sending the key share stored in each node. The MPC process is required to encrypt or decrypt data stored in at least one of the nodes—the controlled node and the other node.

Step 320 discloses storing usage log of the key share stored in the controlled node. The usage log may be stored in a memory address of the controlled node or in another device, as the controlled node may send usage data of the key share to the other device. The other device may be a dedicated server, an administrator's device or any other device. The usage log may be updated with every cryptography operation, or periodically or in response to a process that requires the key share. The usage log is tamper proof since each usage of the second share stored in the controlled node requires activating the communication module which reports to the usage log module.

Step 330 discloses processing the usage log. Such processing may be performed periodically, for example once per hour, or in response to an event, for example detection of more than 500 uses of the key share within 10 minutes. Processing the usage log may include comparing the usage log to a predefined set of rules. The rules may be stored in the controlled node, in the entity in which the node resides, or in a remote location. The output of the usage log processing may be transmission of a message to a predefined address, for example the administrator's phone, temporarily disabling communication from the node outwards, temporarily disabling usage of the key share, deleting the key share and the like. The outcome of the processing stage may be sent to a control unit residing in the controlled node, and the control unit will actually change the operation mode of the key share.

Step 340 discloses the control unit of the controlled log receiving a command to change an operation mode of the key share. The command may be received via a secured protocol. The command may be received from an administrator device and may require the administrator to input a secret in order for the control unit to process the command. The command may be general, for example disable the key share, or may be specific, and specify how to disable the key share, as elaborated below.

Step 350 discloses the control unit of the controlled log modifying the key share operation mode. Modifying the operation mode comprises disabling the MPC process between the controlled node and the other node. Modifying the key share operation mode may include multiple options, for example disabling communication between the controlled node and the other node, preventing access to the memory address storing the key share, deleting the key share or any other process or operation desired by a person skilled in the art that prevents the MPC process.

Step 360 discloses enabling the MPC process between the controlled node and the other node. Such enabling may comprise restoring communication with the non-controlled node, re-configuring a memory in the controlled node and the like.

Figure 4:
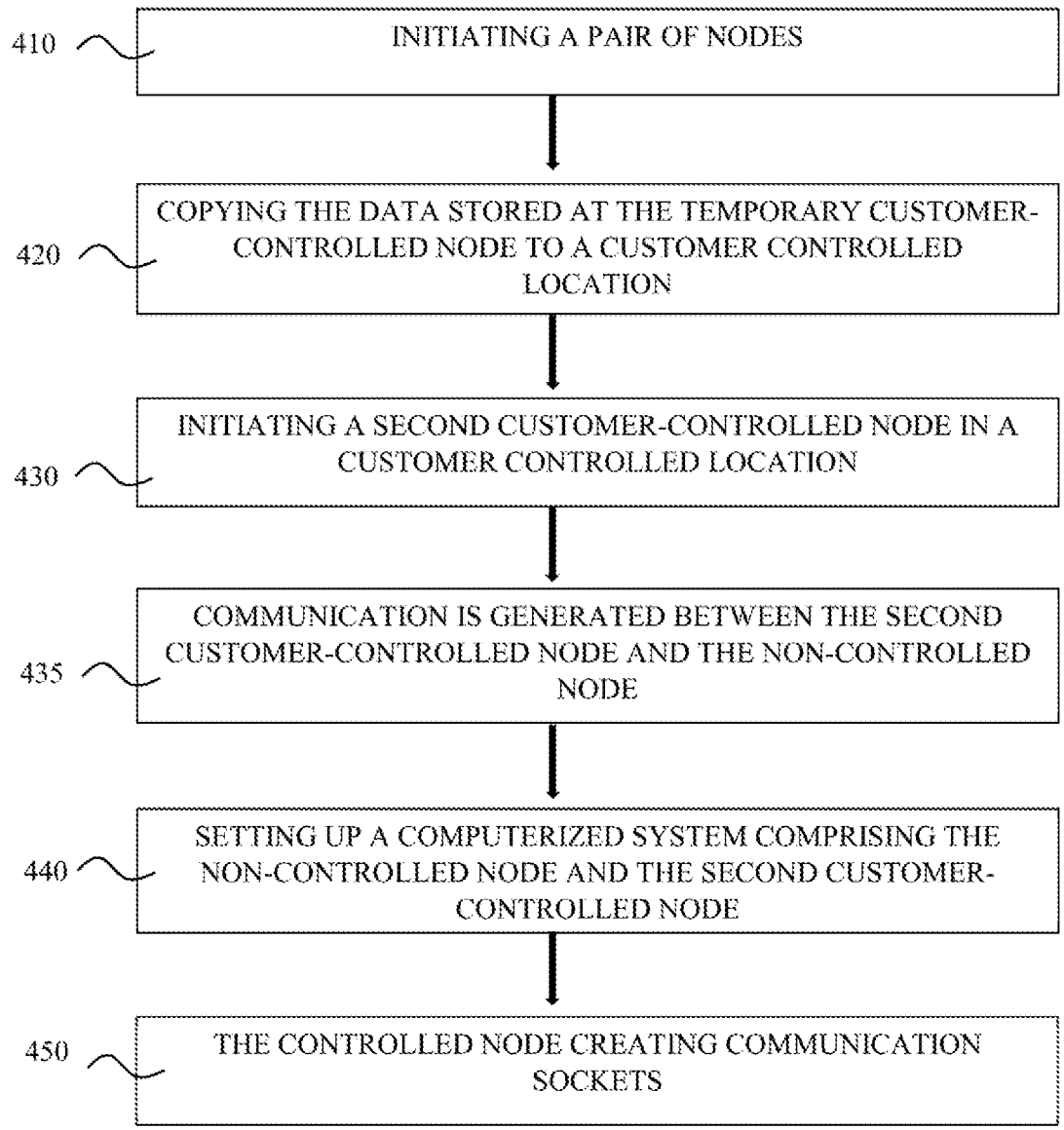

FIG. 4 shows a method for set up stage of the nodes, according to exemplary embodiments of the subject matter.

Step 410 discloses initiating a pair of nodes. At least one of the two nodes may be stored in an online server, also defined as a cloud service. Initiation of the pair of nodes may be excluded from when method in case the method is applied on nodes already initiated. Initiation of the pair of nodes comprises allocating storage space for each node, an IP address and a preferably handshake process between the nodes. In some exemplary embodiments, the nodes are shut down, rebooted, and an image of a known and malware-free hardened operating system is copied into the nodes. After copying the malware-free operating system, a Transport Layer Security (TLS) communication channel is generated between the nodes. In some exemplary cases, one node is controlled by a service provider such as an online storage provider for example AWS and the second node is a temporary node controlled by the customer, also residing online, for example in the cloud service server for example residing on the customer's data center and capable of communicating with the first node.

Step 420 discloses copying the data stored at the temporary customer-controlled node to a customer controlled location, for example the customer's data center. Then, in step 430, the temporary customer-controlled node is deleted from the cloud.

Step 430 discloses initiating a second customer-controlled node in a customer controlled location, for example the customer's data center, or on the cloud. The second customer-controlled node replaces the deleted customer-controlled node which was stored on the cloud server. Then, in step 435, communication is generated between the second customer-controlled node and the non-controlled node. The term non-controlled node also refers to a node not controlled by the owner of the data, for example a node controlled by a service provider such as AWS. Generating the communication may be performed using a TLS process.

Step 440 discloses setting up a computerized system comprising the non-controlled node and the second customer-controlled node. Setting up the computerized system comprising the two nodes may include rebooting the nodes, copying a malware-free operating system into the two nodes, copying the data stored at the temporary customer-controlled node into the controlled node and generating a Transport Layer Security (TLS) communication channel between the second customer-controlled node and the non-controlled node.

Step 450 discloses the controlled node creating communication sockets, for example opens web sockets that allow communication between the controlled node and the non-controlled node. The communication sockets enable the non-controlled node to communicate with the controlled node 3, while disabling the controlled node to initiate communicate with the non-controlled node.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized system for controlling access to encrypted data, comprising:
   a first node, comprising a first memory storage configured to store a first share of a cryptographic key and a communication module; and
   a second node, in communication with the first node, comprising a second memory storage configured to store a second share of the cryptographic key, wherein the first share and the second share of the cryptographic key are required to perform a cryptographic operation using a multiparty computation (MPC) process,
   wherein none of the first node and the second node has access to the share of the cryptographic key stored in another node, and
   wherein the second node further comprises:
      a control unit configured to change an operation mode of the second share from enable to disable, wherein the disable operation mode prevents performing the cryptographic operation receiving as input the first share and the second share of the cryptographic key using the MPC process,
      a log storage configured to store operations that require the second share,
      a processing module extracting information from the log storage and configured to determine irregular use of the second share,
      multiple different shares of cryptographic keys, each of the shares is configured to enable decryption of data in a different node communicating with the second node, and
      wherein the processing module generates a process for changing the operation mode of the second share from enable to disable upon determination of the irregular use of the second share.

2. The system of claim 1, wherein the first node is located on an online storage platform and the second node is located in a data center.

3. The system of claim 1, wherein the second node further comprises a management interface configured to enable a user of the system to input a command to change the operation mode of the second share.

4. The system of claim 1, further comprises a key share storage configured to store key shares of multiple containerized software modules requesting access from the security server.

5. A method, comprising:
   obtaining a first node and a second node in communication with the first node, the first node comprises a first memory storage configured to store a first share of a cryptographic key and a communication module, the second node comprises a second memory storage configured to store a second share of the cryptographic key, wherein none of the first node and the second node has access to the share of the cryptographic key stored in another node,
   wherein the second node further comprises:
      a log storage configured to store operations that require the second share,
      a processing module extracting information from the log storage and configured to determine irregular use of the second share,
      multiple different shares of cryptographic keys, each of the shares is configured to enable decryption of data in a different node communicating with the second node, and
      wherein the processing module generates a process for changing the operation mode of the second share from enable to disable upon determination of the irregular use of the second share;
   performing a multi-party computation (MPC) process between a controlled computerized node and another node using the first share and the second share;
   receiving a command to change an operation mode of the key share from enable to disable, wherein the disable operation mode prevents performing the cryptographic operation receiving as input the first share and the second share of the cryptographic key using the MPC process; and changing the operation mode of the key share.

6. The method of claim 5, further comprises storing usage log of the key share stored in the controlled node.

7. The method of claim 6, further comprises processing the usage log and identify irregular behavior in key share usage.

8. The method of claim 6, wherein the command is received from an administrator device receiving the usage log of the key share.

9. The method of claim 5, wherein changing the operation mode of the key share disables the MPC process.

10. The method of claim 5, wherein changing the operation mode of the key share comprises disabling communication between the controlled computerized node and the other node.

11. The method of claim 5, wherein changing the operation mode of the key share comprises deleting the key share from a memory of the controlled computerized node.

12. The method of claim 5, further comprises a set up stage of the first node and the second node.

13. The method of claim 12, further comprises copying an image of a known and malware-free hardened operating system into the first node and the second node.

14. The method of claim 12, further comprises creating a temporary customer-controlled node and copying the data stored at the temporary customer-controlled node to a customer controlled location and creating a second customer-controlled node.

15. The method of claim 14, further comprises copying the data stored at the temporary customer-controlled node to the second customer-controlled node.

16. The method of claim 15, further comprises generating a Transport Layer Security (TLS) communication channel between the second customer-controlled node and the non-controlled node.

\* \* \* \* \*